US007930929B2

(12) United States Patent
Galtier et al.

(10) Patent No.: US 7,930,929 B2
(45) Date of Patent: Apr. 26, 2011

(54) METHOD OF TRANSMITTING INFORMATION RELATING TO THE OPERATION OF AN INTERNAL COMBUSTION ENGINE

(75) Inventors: Frédéric Galtier, Montpellier (FR); Philippe Avian, Goyrans (FR); Jeremy Blanc, Toulouse (FR); Willem Teulings, Fontenilles (FR)

(73) Assignee: Continental Automotive France, Toulouse (FR)

( * ) Notice: Subject to any disclaimer, the term of this patent is extended or adjusted under 35 U.S.C. 154(b) by 286 days.

(21) Appl. No.: 12/279,847

(22) PCT Filed: Mar. 2, 2007

(86) PCT No.: PCT/EP2007/001810

§ 371 (c)(1), (2), (4) Date: Oct. 9, 2008

(87) PCT Pub. No.: WO2007/107228

PCT Pub. Date: Sep. 27, 2007

(65) Prior Publication Data

US 2009/0217744 A1 Sep. 3, 2009

(30) Foreign Application Priority Data

Mar. 20, 2006 (FR) .................................... 06 02409

(51) Int. Cl.
*G01M 15/04* (2006.01)

(52) U.S. Cl. ................................ 73/114.26; 73/114.25

(58) Field of Classification Search ............... 73/114.25, 73/114.26

See application file for complete search history.

(56) References Cited

U.S. PATENT DOCUMENTS

| | | | | |
|---|---|---|---|---|
| 5,570,016 | A * | 10/1996 | Schroeder et al. | 324/207.25 |
| 5,955,663 | A | 9/1999 | Ries-Muller et al. | |
| 6,041,647 | A * | 3/2000 | Matsuoka | 73/114.26 |
| 6,433,539 | B2 * | 8/2002 | Gaessler et al. | 324/207.25 |
| 6,606,552 | B2 * | 8/2003 | Haimerl et al. | 701/115 |
| 6,667,696 | B2 * | 12/2003 | Rodi | 341/11 |

(Continued)

FOREIGN PATENT DOCUMENTS

DE 41 31 497 A1 3/1993

(Continued)

OTHER PUBLICATIONS

Cantie et al., "Capteur a effet Hall permettant de determiner la position absolue d'un arbre de vilebrequin dans un moteur a combustion interne," SIEMENS AG 2004, pp. 1-3 IPCOM (Jan. 2005).

Teulings et al., "Start-Strategy and Crankshaft Sensor Concept for Optimal Stop/Start Operation of a μ-Hybrid Vehicle," AEA 2006 Futuroscope, pp. 1-6 (Apr. 5-6, 2006).

(Continued)

*Primary Examiner* — Freddie Kirkland, III

(74) *Attorney, Agent, or Firm* — Young & Thompson

(57) ABSTRACT

A method of transmitting information making it possible to monitor the operation of an internal combustion engine, includes the steps of:

Figure 1:
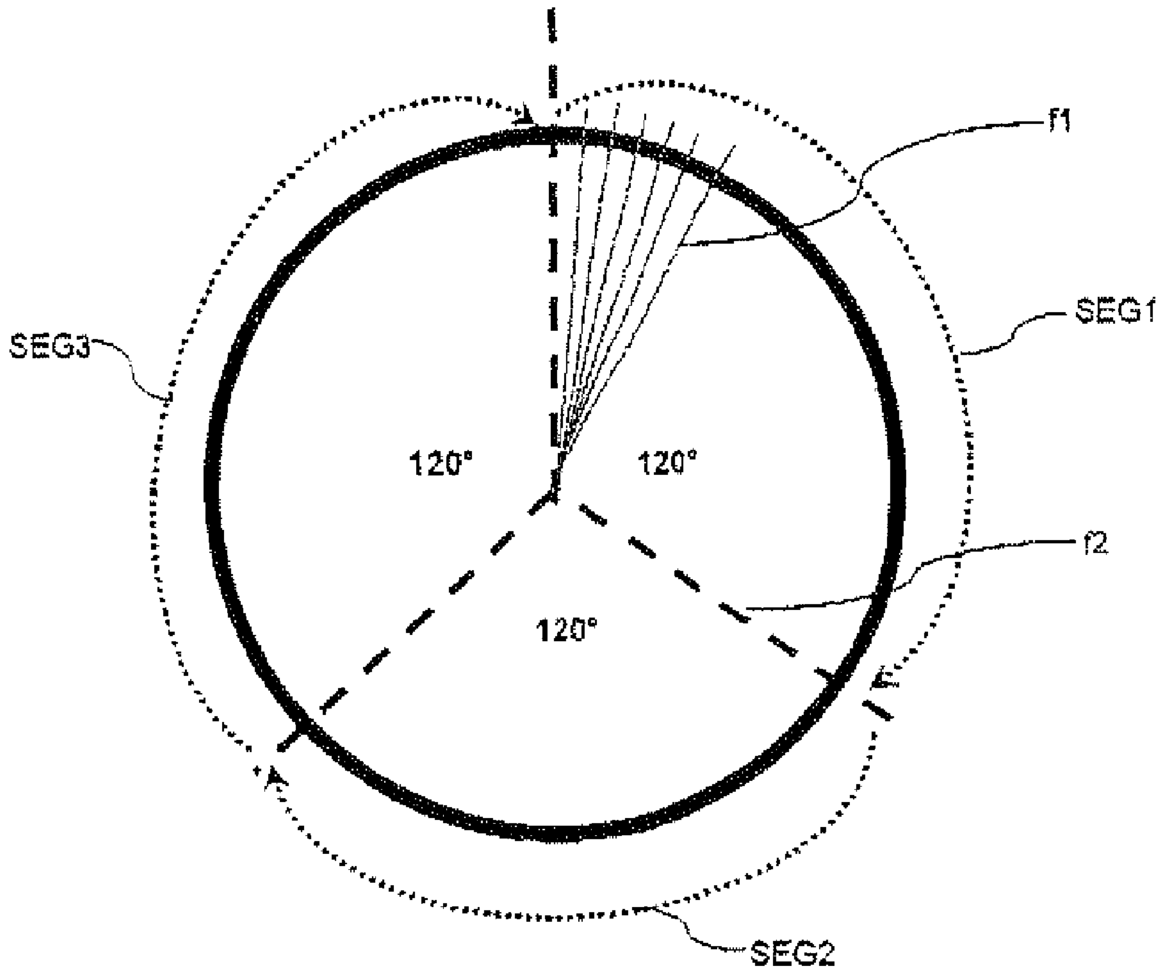

measuring the angular position of a crankshaft via an absolute position sensor provided with a digital output, and transmitting at a frequency f1 to an engine control unit the measured angular position information, encoded in a data string containing N1 bits, transmitting at a frequency f2 of the measured angular position information, encoded in a data string containing N2 bits, the number N2 of bits being greater than the number N1, the frequency f2 being less than or equal to the frequency f1. The encoding in N1 bits allows transmission of angular position information at low resolution, whereas the encoding in N2 bits allows the transmission of high resolution information, able to detect misfirings.

12 Claims, 1 Drawing Sheet

U.S. PATENT DOCUMENTS

| | | | | |
|---|---|---|---|---|
| 6,715,340 | B2 * | 4/2004 | Yamada et al. | 73/35.08 |
| 7,104,119 | B1 * | 9/2006 | Trapasso et al. | 73/114.26 |
| 7,184,876 | B2 | 2/2007 | Teulings et al. | |
| 7,323,864 | B2 | 1/2008 | Teulings et al. | |
| 7,323,865 | B2 | 1/2008 | Teulings et al. | |
| 7,536,250 | B2 * | 5/2009 | Eisenkolbl et al. | 701/103 |
| 7,606,655 | B2 * | 10/2009 | Husted et al. | 701/111 |
| 7,725,242 | B2 * | 5/2010 | Nakata et al. | 701/105 |
| 2002/0033041 | A1 | 3/2002 | Yamada et al. | |
| 2002/0167420 | A1 | 11/2002 | Rodi | |
| 2002/0173902 | A1 | 11/2002 | Haimerl et al. | |

FOREIGN PATENT DOCUMENTS

| | | | |
|---|---|---|---|
| DE | 101 23 292 | A1 | 11/2002 |
| DE | 101 24 017 | A1 | 11/2002 |
| FR | 2 863 049 | A1 | 6/2005 |
| FR | 2 871 880 | A1 | 12/2005 |
| WO | 01/40643 | A1 | 6/2001 |
| WO | 2004/109234 | A2 | 12/2004 |

* cited by examiner

METHOD OF TRANSMITTING INFORMATION RELATING TO THE OPERATION OF AN INTERNAL COMBUSTION ENGINE

BACKGROUND OF THE INVENTION

The present invention relates to the operation of internal combustion engines.

More precisely, the invention relates, according to one of its first aspects, to a method of transmitting information making it possible to monitor the operation of an internal combustion engine, consisting of:

Measurement of the angular position of a crankshaft, and

Transmission at a frequency f1 to an engine control unit of the measured angular position information encoded in a data string containing N1 bits.

DESCRIPTION OF RELATED ART

Present day internal combustion engines are equipped with an engine control unit (ECU), a crankshaft and a device making it possible to know the angular position of the crankshaft when the engine is running.

The engine control unit makes it possible to regulate the injection and the ignition (for an engine with controlled ignition) in each cylinder when the engine is running.

Knowledge of the angular position of the crankshaft therefore makes it possible to determine the position of the pistons in the cylinders and to know the state of the cycle of the four-stroke engine (intake, compression, combustion, exhaust).

A usual means of measuring the angular position of the crankshaft is to provide said crankshaft, coupled with the movement of the pistons, with a target provided with marks (mechanical, optical, magnetic, etc.) passing in front of an associated detector element (sensor). This type of position sensor is called "incremental" in that it does not give an absolute position, but allows the ECU to determine it by incrementing a counter each time a mark passes. The ECU can then extract the absolute position of the crankshaft by counting the number of marks seen with respect to a reference mark.

For combustion management reasons, notably in order to reduce the pollution of the engine, the fuel consumption and the start-up time, it is henceforth necessary to know the position of the crankshaft with a precision of less than 2°, and for this to be so even at very low or zero speeds, or even at negative speeds of the shaft of the crankshaft (negative speeds which correspond to a reversal of the direction of rotation of the engine during a stalling phase for example).

At the present time, a target mounted on a crankshaft comprises 60 identical and equidistant teeth, which allows a resolution of 6°. It is not possible to increase the number of teeth in order to achieve the sought precision of the order of 2° due to mechanical constraints.

There are however calculation algorithms, installed in the engine control unit which, from data coming from the crankshaft position sensor, make it possible to obtain this resolution of about 2° by interpolation methods, but these algorithms do not function when the speed of rotation of the crankshaft approaches zero or when it becomes negative.

Moreover, certain constraints, such as for example in matters relating to fuel consumption or the emission of pollutants, are making it increasingly necessary to know and to manage events and information in the engine control unit, notably with regard to the detection of misfirings.

A misfiring is a combustion phase of the engine cycle in which the combustion has been poor or not achieved and from which can result pollution at the exhaust or even damage to the catalytic converter.

The detection of the presence of misfirings can be carried out by very precisely monitoring the speed of rotation of the crankshaft and its disturbances. In fact, a misfiring will generate a transient variation in the speed of rotation of the crankshaft, but this phenomenon is dampened by the inertial masses of said crankshaft. Therefore it is necessary to have a sensor having a very good resolution in order to be able to detect and to measure these slight variations in the speed of rotation.

Now, for a given speed of rotation, the better the resolution of the sensor, the higher is the amount of information to send, which results in a high data transmission rate. Engine control units, however, have a limited data reading speed which is therefore exceeded by the data rate which an adequate resolution demands.

Moreover, the encoding of the absolute position over 360° by a conventional analog signal becomes problematic because the noise, inherent in the use of an analog output, generates great uncertainty in the engine control unit regarding the real position of the crankshaft.

By way of example, if the analog output of the sensor varies by 4V for an angular variation of 360°, a noise of 10 mV peak-to-peak on this output represents an uncertainty of 0.9° in the position.

The random nature of the noise therefore makes the detection of misfirings impossible and also adds a large error to the measurement of the angular position of the crankshaft for the management of fuel injection which necessitates a precision of less than 2°.

A subsequent filtering of this analog signal would make it possible to reduce the effect of this noise, but it would introduce a large delay between the angular measurement by the sensor and the complete reception of this measurement by the engine control unit (ECU), a delay which is incompatible with precise measurements at high speeds of rotation.

BRIEF SUMMARY OF THE INVENTION

The problems which the invention aims to solve are therefore to be able both to obtain a resolution of less than 2° in the absolute angular position of the position sensor of the crankshaft and to be able to detect the misfirings. These objectives must be achieved for a range of rotation speeds of the engine extending from a few hundred revolutions per minute in the reverse direction up to more than 10,000 revolutions per minute in the forward direction, without excluding the case of a zero speed of rotation.

With this objective in mind, the method according to the invention comprises the following steps:

measurement of the angular position of the crankshaft in at least N2 bits by means of an absolute position sensor provided with a digital output, and transmission at a frequency f1 to an engine control unit of the measured angular position information, encoded in a data string containing N1 bits, the method being characterized in that it furthermore comprises the step consisting in transmission at a frequency f2 of the angular position information measured and encoded in a data string containing N2 bits, the number N2 being greater than the number N1, the frequency f2 being less than or equal to the frequency f1.

In one embodiment, the frequency f2 is defined at least by the time taken by the crankshaft to reach, starting from an angular position corresponding to the start of a segment, an angular position corresponding to the end of said segment and by the number of bits N2 to be transmitted.

Preferably, the measurement step is carried out by a single absolute position sensor measuring the angular position in at least N2 bits, the step of transmission of the angular position encoded in a data string containing N1 bits being carried out by the truncation of the data string containing N2 bits.

In one embodiment, reaching a threshold value or threshold values triggers the transmission of the angular position having N2 bits.

In one embodiment, the data strings containing N1 and N2 bits respectively are transmitted on two separate channels.

Alternatively, the data strings containing N1 and N2 bits respectively are transmitted on a single channel by means of a multiplexing method.

In a preferred embodiment, the method according to the invention furthermore comprises the steps consisting of:

measuring the time taken to reach, starting from an angular position corresponding to the start of a segment, an angular position corresponding to the end of said segment, measuring the difference between this time value and a reference value, and generating a signal synonymous with a misfiring if this difference is greater than a threshold value.

The invention also relates to a device for monitoring the operation of an internal combustion engine, comprising an absolute crankshaft position sensor configured for:

measuring the angular position of a crankshaft, and transmitting at a frequency f1 to an engine control unit the measured angular position information, encoded in a data string containing N1 bits.

This device is characterized in that the crankshaft position sensor is also configured for:

transmitting at a frequency f2 the measured angular position information, encoded in a data string containing N2 bits, the number N2 of bits being greater than the number N1, the frequency f2 being less than or equal to the frequency f1.

In one embodiment, the crankshaft position sensor measures the angular position in at least N2 bits and encodes the angular position information in a data string containing N2 bits, the sensor being furthermore provided with truncation means in order to encode the angular position information in a data string containing N1 bits and N2 bits (if the measurement is digitized in N2 bits).

Each data string is preferably transmitted on a respective channel.

In an embodiment wherein the two channels are multiplexed, the sensor is provided with at least one output able to transmit the data strings comprising N1 bits and the residue of the truncated N2 bits.

Alternatively, the sensor is provided with two channels able to transmit the data strings comprising N1 bits and the data strings comprising N2 bits respectively.

The method and the device according to the invention are advantageously used in motor vehicles equipped with so-called "Stop & Go" systems in which, when the vehicle is stopped for short periods, the engine is not running but the engine control unit remains powered.

Also, due to the "absolute" nature of the measurement (as soon as it is powered, the sensor provides information on the angular position of the crankshaft), the position of the crankshaft is also available even after longer stopped phases, during which the engine control unit is no longer powered. Due to this property, an optimum start-up can be carried out even after an unlimited period of stoppage (Cold Start).

The solution according to the invention relates equally well to two-stroke internal combustion engines as to four-stroke internal combustion engines, but only four-stroke engines are described here.

Because of the invention, very fine position information, able to detect misfirings, can be sent by an absolute position sensor to an engine control unit having the capability of reading a reduced data rate.

BRIEF DESCRIPTION OF THE DRAWING FIGURE

Other features and advantages of the present invention will appear more clearly on reading the following description, given as an illustrative and non-limiting example with reference to the single appended FIGURE in which:

the single FIGURE is a symbolic representation of the frequencies of the angular position measurement for one revolution of a crankshaft of a six-cylinder engine.

DETAILED DESCRIPTION OF THE INVENTION

According to a first feature of the invention, the problems relating to the random nature of the noise mentioned above are solved for the measurement of the position with a resolution of less than 2° by using a digital output of the absolute angular position sensor.

A second feature of the invention, relating to the transmission of more precise crankshaft position information, that is to say having high resolution, for the detection of misfirings, and to the problem associated with the data rate necessary for the transmission of this data (this data rate not being compatible with the reading capability of the inputs of present day engine control units), is explained below.

For a four-stroke engine, the four strokes of the engine cycle correspond to two revolutions of the crankshaft, that is to say 720°. There is therefore an uncertainty of 360° in the angular position of the crankshaft (the pistons are in exactly the same position, but the stroke of the cycle is not the same) which can be removed by means of a position sensor placed on a camshaft, the camshaft making only one revolution during the four strokes of an engine cycle.

In operating conditions, when the engine is running, the absolute angular position of the crankshaft is directly available in the sensor, and is no longer determined by the engine control unit. However, in a stalling phase, the direction of rotation of an engine can reverse.

A bidirectional incremental sensor could therefore be used as long as the duration of the stopped phase which follows is not longer than a few minutes. However, such bidirectional sensors make it possible to have angular position information in the computer which is valid only during the period of powering of the engine control unit. In fact, in an engine control unit associated with such a sensor, the angular position information is stored in a volatile memory of the engine control unit which empties when the engine is turned off, that is to say when the engine control unit is no longer powered by the battery of the vehicle.

Thus, at each cold start, that is to say after each prolonged period of stoppage, a powering up of the bidirectional incremental sensor and of the engine control unit is carried out and the absolute angular position is not available. Moreover, the resolution of an incremental sensor is only 6°, instead of the expected 2°.

On the other hand, the absolute position sensor according to the invention is preferably implanted in a dedicated integrated circuit (or ASIC standing for "Application Specific Integrated Circuit") making it possible to detect and to transmit the absolute angular position of the crankshaft to the engine control unit ECU.

As described below, at least once per segment, more precise information on the angular position than that transmitted during the rest of the segment is transmitted for the purpose of detecting possible misfirings.

Encoding: Resolution/Number of Bits.

In order to obtain an angular resolution RES (in degrees°) over one revolution (360°), it is necessary to encode the information over M levels such that M=360/RES; that is to say in N bits, where N is the closest natural integer such that $2^N$>=M.

The measurement frequency f2 therefore corresponds to one measurement per angle of value RES.

By way of example, for a resolution RES=0.022°,

M=360/0.022 is determined i.e. M=16,363.64

Now, $2^{14}$=16,384 and therefore N=14.

Thus, in order to obtain a resolution of 0.022°, it is necessary to measure and encode the measurement information in at least 14 bits.

On the other hand, in order to obtain an angular resolution less that 2°, it is only necessary to encode the measurement information over N>=8 bits.

Calculation of the Necessary Data Rate

The engine speed REG expressed in rpm is REGI expressed in °/sec.

Thus REGI=(360°/60 sec)*REG i.e. REGI=6*REG

The time taken for rotating through an angle equal to the angular resolution REG is therefore

T=RES/REGI i.e. t=RES/6*REG

Also, the communication data rate (in Baud) must therefore be: D=N/t i.e. D=6*REG*N/RES That is to say, with the following values:

REG=10,000 rpm

N=14 bits

RES=0.022°

The data rate D allowing continuous measurement at the resolution RES must be:

D=6*10,000*14/0.022=42 MBaud

In this way, it is possible to calculate the data rate D and the number of bits N necessary for encoding an angular measurement with a given resolution RES at a given engine speed REG.

Examples of such calculations are given in table 1 below, with an engine speed of a present day vehicle at the maximum of about 10,000 rpm.

TABLE 1

| D (Baud) | N (bits) | REG (rpm) | RES (°) |
|---|---|---|---|
| 42,000,000 | 14 | 10,000 | 0.02 |
| 342,857 | 8 | 10,000 | 1.4 |
| 7,000 | 14 | 10,000 | 120 |

Now, the maximum reading speed of the digital inputs of present day ECUs is of the order to 500 kBaud. This data rate is incompatible with the continuous transmission at a resolution making it possible to detect a misfiring, corresponding to an angular resolution of the order of 0.02°.

Moreover, the transmission of binary data at a data rate higher than 500 kBaud through a long connection system comprises risks of electromagnetic interference with other devices of the vehicle.

The detection of misfiring according to the invention is synchronized with the ignition and consists in being carried out by the detection and comparison of the times of segments. A misfiring in fact imparts a temporary variation in the speed of rotation of the crankshaft.

A segment is an angular region of the crankshaft. More precisely, a segment is an angular period. The segment time is the time of passage of the segment. The segment is thus defined by the angle which separates two reference positions of two successive cylinders in the order of ignition. This angular region corresponds to a specific movement of the pistons in their respective cylinders.

In a cylinder, a piston travels a path passing through two characteristic points: the top dead center (TDC) and the bottom dead center (BDC). These two characteristic points can advantageously serve as reference points for the definition of the segments. For this purpose, the times which separate two successive top dead centers of two successive pistons in the order of ignition can for example define a segment time.

The segment time during which the crankshaft traverses this angular region depends, among other things, on the energy converted during the combustion phase. A misfiring consequently increases the segment time.

For a multi-cylinder engine with regularly distributed segments, the value of the segment in degrees is SEG=720/C, C being the number of cylinders.

i.e. SEG=180° for a four-cylinder engine,

SEG=120° for a six-cylinder engine, etc.

According to the invention, the transmission of high resolution measurements (N2 bits) can only be carried out once per segment, that is to say every 720/C°. The frequency f2 of transmission of the high resolution (N2 bits) angular position information therefore corresponds in this embodiment to sending the angular position information at the start of each segment only.

For the purpose of detecting a misfiring, it is possible to compare the segment times not of all the successive segments with respect to each other but for a same segment between two or several successive revolutions, in each revolution of the crankshaft. To this end, each absolute position measurement carried out is continuously compared with reference values, corresponding to the SEG degrees separating the start and end positions of the segments.

In fact, the crankshaft position sensor measures the angular position of the crankshaft in at least N2 bits but transmits this information in only N1 bits for most of the time, the difference between N2 and N1 being produced by truncation.

A particular angular position is associated with a particular trigger value, for example in the mentioned ASIC circuit, corresponding to the start or to the end of a segment (0°, 120°, 240° in the single FIGURE).

When the sensor reaches a trigger value corresponding to the start or to the end of a segment, it transmits the angular position signal encoded in N2 bits.

For the other angular values, the sensor again transmits the angular position signal encoded in N1 bits.

According to the invention, the engine control unit comprises a model of the normal behavior of the engine, that is to say without misfirings.

Typically, the model comprises at least one reference value which, for a given segment, is equal to the segment time of said segment without misfirings. The measurement of the segment time is compared with this reference value and the difference between these two values is compared with a threshold value. If the difference is greater than or equal to the threshold value, the engine control unit considers that a misfiring has taken place and, for example, generates a signal to this effect.

For example, the reference value for a given segment time is the segment time of that segment during the preceding crankshaft revolution.

Referring to the single FIGURE, it is a matter of comparing the segment time SEG1 in revolution T with the segment time SEG1 in revolution T-1, and similarly for the segments SEG2 and SEG3.

Preferably, the threshold value depends on the speed of rotation of the engine, and the variations of the speed of rotation of the crankshaft due to changes in engine speed (acceleration or braking of the vehicle by its driver) and which could disturb the measurement are corrected by a specific algorithm.

The system according to the invention is based on a sensor of the absolute position of the crankshaft over 360°, provided with an interface configured to supply an entirely digital output signal.

In one embodiment, the crankshaft position sensor is provided with two output channels, each of which channels transmits a digital signal.

The first channel is used for transmitting a first signal corresponding to the information relating to the angular position of the crankshaft at low resolution (N1 bits). The angular position of the crankshaft at low resolution (N1 bits) is transmitted at a frequency f1.

The second channel is used for transmitting a second signal corresponding to information relating to misfirings, that is to say to the angular position of the crankshaft at high resolution (N2 bits). The angular measurement of the crankshaft in at least N2 bits is transmitted in N2 bits at a frequency f2.

Alternatively both signals are transmitted on a same channel by a multiplexing method.

Preferably, the transmission rate, that is to say the data rate, is fixed.

For example, as seen previously in table 1, a resolution of less than 2°, that is to say 1.4°, can be encoded in 8 bits (N1). Consequently, the minimum data rate necessary for allowing the transmission of this information at an engine speed REG of 10,000 revolutions per minute is 342 kBaud. The low resolution angular position signal is therefore sent about every 24 μs (1/324*8), shown by the solid lines f1 in the single FIGURE.

The high resolution angular position signal encoded in 14 bits (N2) can be transmitted every 120° for a six-cylinder engine, shown in dotted lines f2 in the single FIGURE.

As the data rates supported by present day management devices are of the order to 500 kBaud, it is therefore possible to add supplementary information to the binary word of N1 bits and corresponding, if necessary, to the remainder of the necessary N2 bits.

Because of this configuration, since high resolution angular position information only needs to be transmitted at the start of the segments, if a data string of N2 bits cannot be entirely transmitted in the period of time allocated for the transmission of the N1 bits, because of the data rate of the engine control unit, the remaining bits can be transmitted in at least one following string of N1 bits during the time of the segment in question.

The type of absolute position sensor used and provided with a high resolution necessitates an "in situ" calibration because of the positioning uncertainties imparted during the fitting of said sensor on the internal combustion engine.

The invention claimed is:

1. A method of transmitting information making it possible to monitor an operation of an internal combustion engine, comprising the steps consisting of:

measurement of an angular position of a crankshaft by means of an absolute position sensor provided with a digital output, and transmission at a frequency f1 to an engine control unit of the measured angular position information, encoded in a data string containing N1 bits, and transmission at a frequency f2 of the measured angular position information, encoded in a data string containing N2 bits, the number N2 of bits being greater than the number N1, the frequency f2 being less than or equal to the frequency f1, wherein the measurement step is carried out by a single absolute position sensor measuring the angular position in at least N2 bits, the step of transmission of the angular position encoded in a data string containing N1 bits being carried out by the truncation of the data string containing N2 bits.

2. The method as claimed in claim 1, wherein the frequency f2 is defined at least by a time taken by the crankshaft to reach, starting from an angular position corresponding to a start of a segment, an angular position corresponding to a end of said segment and by the number of bits N2 to be transmitted.

3. The method as claimed in claim 2, characterized in that the measurement step is carried out by a single absolute position sensor measuring the angular position in at least N2 bits, the step of transmission of the angular position encoded in a data string containing N1 bits being carried out by the truncation of the data string containing N2 bits.

4. The method as claimed in claim 2, characterized in that reaching a threshold value or threshold values triggers the transmission of the angular position having N2 bits.

5. The method as claimed in claim 2, characterized in that the data strings containing N1 and N2 bits respectively are transmitted on two separate channels or on a single channel by means of a multiplexing method.

6. The method as claimed in claim 2, furthermore comprising the steps consisting of:

measuring a time taken to reach, starting from an angular position corresponding to a start of a segment, an angular position corresponding to a end of said segment, measuring a difference between this time value and a reference value, and generating a signal synonymous with a misfiring if this difference is greater than a threshold value.

7. The method as claimed in claim 1, characterized in that reaching a threshold value or threshold values triggers the transmission of the angular position having N2 bits.

8. The method as claimed in claim 1, characterized in that the data strings containing N1 and N2 bits respectively are transmitted on two separate channels or on a single channel by means of a multiplexing method.

9. The methods as claimed in claim 1, furthermore comprising the steps consisting of:

measuring a time taken to reach, starting from an angular position corresponding to a start of a segment, an angular position corresponding to a end of said segment, measuring a difference between this time value and a reference value, and generating a signal synonymous with a misfiring if this difference is greater than a threshold value.

10. A device for monitoring an operation of an internal combustion engine, comprising an absolute crankshaft position sensor configured for:

measuring an angular position of a crankshaft, and transmitting at a frequency f1 to an engine control unit the measured angular position information, encoded in a data string containing N1 bits, transmitting at a frequency f2 the measured angular position information, encoded in a data string containing N2 bits, the number N2 of bits being greater than the number N1, the frequency f2 being less than or equal to the frequency f1, wherein the absolute crankshaft position sensor measures the angular position in at least N2 bits, the sensor being furthermore provided with truncation means in order to encode the angular position information in a data string containing N1 bits and N2 bits, if the measurement is digitized in more than N2 bits.

11. The device as claimed in claim 10, characterized in that the sensor is provided with at least one output able to transmit the data strings comprising N1 bits and a residue of the truncated N2 bits or with two outputs able to transmit the data strings comprising N1 bits and the data strings comprising N2 bits respectively.

12. A method of transmitting information making it possible to monitor an operation of an internal combustion engine, comprising the steps:

measurement of an angular position of a crankshaft by means of an absolute position sensor provided with a digital output, and transmission at a frequency f1 to an engine control unit of the measured angular position information, encoded in a data string containing N1 bits, and transmission at a frequency f2 of the measured angular position information, encoded in a data string containing N2 bits, the number N2 of bits being greater than the number N1, the frequency f2 being less than or equal to the frequency f1, wherein in reaching a threshold value or threshold values triggers the transmission of the angular position having N2 bits.

* * * * *